United States Patent [19]

Simon

[11] Patent Number: 4,628,808

[45] Date of Patent: Dec. 16, 1986

[54] CUTTING DEVICE

[76] Inventor: Nicola-Carlo Simon, Burghardtgasse 6/2, A-1200 Vienna, Austria

[21] Appl. No.: 737,349

[22] PCT Filed: Sep. 19, 1984

[86] PCT No.: PCT/EP84/00289

§ 371 Date: Apr. 15, 1985

§ 102(e) Date: Apr. 15, 1985

[87] PCT Pub. No.: WO85/01240

PCT Pub. Date: Mar. 28, 1985

[30] Foreign Application Priority Data

Sep. 20, 1983 [AT] Austria ................................ 3348/83

[51] Int. Cl.[4] .............................................. A23N 7/00

[52] U.S. Cl. ........................................ 99/538; 99/537; 99/593

[58] Field of Search ................. 99/537, 538, 539, 567, 99/589, 588, 590, 594–598, 593; 83/425.1, 865, 733, 56; 426/518, 615, 637

[56] References Cited

U.S. PATENT DOCUMENTS

| | | | |
|---|---|---|---|
| 1,992,715 | 2/1935 | Ovenhausen . | |
| 2,156,645 | 5/1939 | Waller | 99/594 |
| 2,349,465 | 5/1944 | Rupin . | |
| 2,489,581 | 11/1949 | Mason | 99/537 |
| 3,211,202 | 10/1965 | Mason | 99/592 |
| 4,170,174 | 10/1979 | Ditty et al. . | |
| 4,332,190 | 6/1982 | Mart . | |
| 4,387,111 | 6/1983 | Mullender | 99/538 X |

FOREIGN PATENT DOCUMENTS

| | | | |
|---|---|---|---|
| 2605682 | 8/1977 | Fed. Rep. of Germany | 99/537 |
| 3139413A1 | 3/1981 | Fed. Rep. of Germany . | |

*Primary Examiner*—Timothy F. Simone
*Attorney, Agent, or Firm*—Hayes, Davis & Soloway

[57] ABSTRACT

In the cutting apparatus the item to be cut is helicoidally cut by a blade. In order to be able easily to use the cutting apparatus and to hold securely the item to be cut (5) during the cutting operation, it is proposed according to the invention that the holding means (6) be provided with a funnel-shaped depression (funnel 7) situated in the axis of rotation for centering said item to be cut (5).

3 Claims, 3 Drawing Figures

CUTTING DEVICE

The invention concerns a cutting device.

Unlike the cut product that in the conventional cutting machines is obtained in the shape of discs, there is obtained, when using a cutting device of this kind, a cohesive end product coiled to form a helical surface.

In order to be able to offer in a manner suitable for eating, for example radishes such as are sold in beer gardens and guest houses, it is necessary even today to use a radish cutter with a crank handle. There are also known radish cutters driven by a motor. In such a cutter the rotation of the radish by means of the crank handle is eliminated. The axis of rotation in this radish cutter is horizontal the same as in the radish cutter with a crank handle. To be able correctly to use the already known radish cutter, both hands are required during the cutting operation. With one hand the motor and the cam are pushed along a guide horizontally in a direction toward a threaded spindle and a blade. With the same hand the starting push-button is pressed as long as the motor has to run. With the other hand the curled radish coils that move away from the blade are advanced and guided into a receptacle. Thus, the manipulation of this apparatus is relatively complicated.

DE-OS No. 31 39 413 refers to a substantially improved automatic radish cutter. An electromotor is movable in a vertical guide and drives a cam for transmitting the rotary motion to a radish. Opposite to the cam is provided a threaded spindle on which the radish is vertically slipped. The cam is then superimposed on the upper end of the radish. Due to the driving via a cam, the radish is threaded on the threaded spindle and cut in the shape of spirals by a blade that stands radially with respect to the threaded spindle. Here the ascent of the threaded spindle determines the cutting gauge. If the radish is warped or has not been centrally slipped on the threaded spindle, disturbances in the operation of said radish cutter can of course occur. The radish then, after a few revolutions, ceases to be clamped between cam and blade. Thereby the motor with the cam suddenly sinks on the guide. This can result in damages to the cutting device, to the cam and to the threaded spindle. In addition, most of the time the radish can no longer be used.

The present invention is based on the problem of providing a cutting device of the kind in question that is of simple construction, easy to use, and whereby it is ensured that the item to be cut be firmly clamped during the cutting operation.

According to the present invention this problem is solved by the features stated in the characteristic part of claim 1.

Accordingly, the support for the item to be cut is provided with a funnel-shaped depression in the axis of rotation for the purpose of centering the item to be cut and with a recess for the blade, which recess starts from the passage point of the axis of rotation and extends substantially radially. The cutting edge of the blade at the same time projects above the tapered surface and defines an aperture through which the helically cut product can be discharged.

The item to be cut advances in the direction toward the blade by virtue of a weight such as the electromotor itself or a separate weight that holds the item to be cut with a cam so that the blade works into the item to be cut.

Here either the item to be cut can itself be rotated or the blade is rotated against the item that does not then rotate.

The distance by which the cutting edge of the blade projects above the tapered surface corresponds to the cutting gauge and thus to the advance per revolution.

The support, by virtue of its funnel-shaped construction, has an auto centering action for the item to be cut. In addition, the insertion of the item into the cutting device is substantially simpler since the item must be introduced into the funnel-shaped support only by one end and the other end must be connected with the weight. Hereby the item to be cut is pressed into the funnel and fed to the blade, which cuts the item in the form of a helical coil. The cut item runs through the aperture below the blade away from the support and is collected, for instance, in a tray.

Coils of radish can be immediately eaten as beer radish. Cucumber coils are used in salad dishes. Sausage and cheese coils look specially decorative in a dish of cold cuts. The packing and transportation are in addition simple and space saving, since the coils in narrowly adjacent state correspond to the original shape of the item to be cut. After unpacking, they can be stretched to the length desired.

The centering can be assisted by a spindle situated in the geometric axis of rotation of the support and oriented toward the cam and the item to be cut can be slipped thereon. The stop face could also be shaped as a cone oriented toward the cam and having along a generatrix the blade and the aperture for allowing the discharge of the cut coils. For items to be cut that are hard it is convenient if the blade is built as a circular blade with electromotive drive. Alternatively, a rotary band blade can also be used.

The invention is explained in further detail in two embodiments with reference to the drawing. In the drawing.

Figure 1:
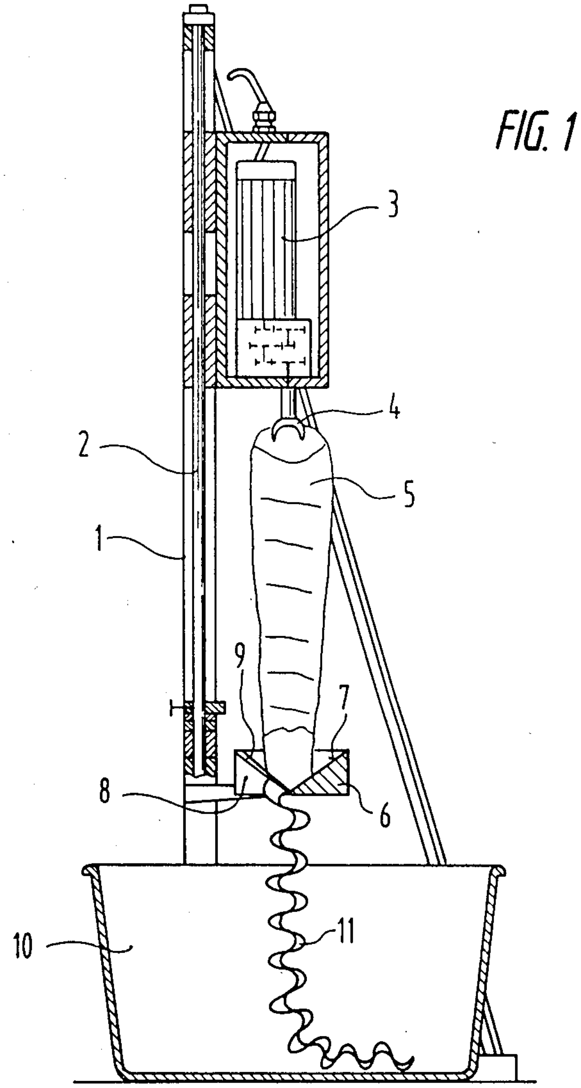
FIG. 1 is a side view in partial section of a cutting device according to the invention wherein the item to be cut is rotated against a stationary blade, said blade being situated in a funnel-shaped support.
Figure 2:
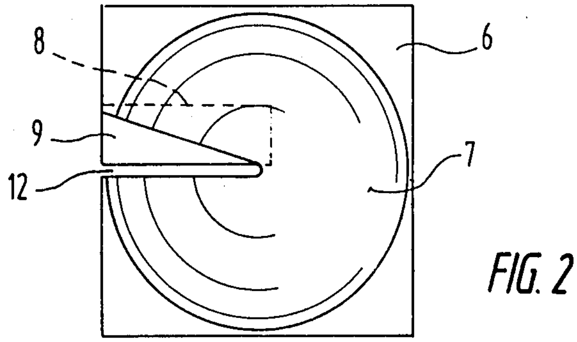
FIG. 2 is a top view on the funnel-shaped support with the inserted blade.

On a vertical post 1 there are provided guides 2 in which there is a freely movable motor 3 having a motor housing and slots. In the upper initial position (normal position) illustrated, the motor 3 can be held by a detent or detachable latch (not shown). A cam 4 is situated on the motor shaft. As shown in FIG. 1, it is possible to insert between motor 3 and cam 4 a gear for adapting the speed to the cutting operation. The cam has clutches that mesh into the item to be cut, which is here a radish 5. On the same axis with the cam 4 there is provided in the area of the lower end of the guides 2 a support 6 in the form of a funnel 7. The funnel can be built as a plastic body with a tapered depression. In the funnel surface is a radially oriented recess 8 through which the cutting edge of a blade 9 projects in the interior of the funnel 7. A receptacle 10 is inserted beneath the funnel 6.

The cutting device works as follows: the item to be cut—the radish 5—is introduced in the funnel 7 and, by lowering the motor 3 on the guide 2, it is clamped and centered between the funnel 7 and the cam 4. If the radish 5 is set to rotate after switching on the motor 3, the blade 9 starts to act, the own weight of the motor 1 advancing the radish 5 against the blade 9 in the funnel 7. The radish is cut up to form a screwed surface 11 that slides slowly into the receptacle 10. If the radish 5 is cut open, that is, if it reaches the lower position of the motor 3, then a limit switch, which at the same time can be designed as a circuit closer, disconnects the motor 3. The remaining residue of the radish 5 on the cam 4 is removed, the motor 3 is lifted to the initial position, and the device is ready for the next cutting operation.

The blade 9 is shown in the figures with a straight cutting edge. The cutting edge can also be coiled in an involute shape so that a draw cut will result. In this case it is convenient that the aperture be adapted to the curved shape of the cutting edge. The blade can likewise be shaped as a rotary circular blade. The cutting edge of the blade 9 projects in the inner tapered surface and thus determines the cutting gauge of the radish coils that leave below the blade through the aperture 12. By changing the position of the blade 9, the cutting gauge can be adjusted.

Figure 3:
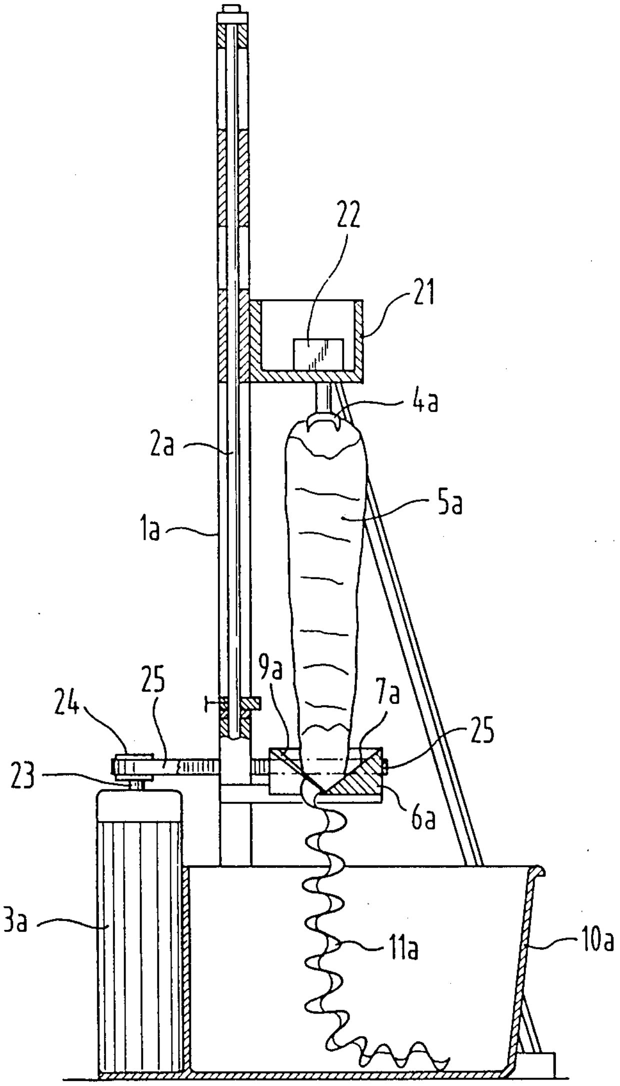
FIG. 3 is a side view in partial section of a cutting device according to a second embodiment of the invention.

In FIG. 3 there is illustrated a second embodiment of a cutting device, there being used for the same or similar elements the same reference numerals to which only an "a" has been added. On a vertical post 1*a* there have been provided guides 2*a* in which a weight 21 is freely movable in the manner of a slide. The weight 21 can be supplemented by additional weights 22. With the weight is connected a cam 4*a*, which meshes with clutches into the item to be cut, here again a radish 5*a*. On the same axis with the cam 4*a* there is provided in the area of the lower end of the guide 2*a* a support 6*a* in the shape of a funnel 7*a*. As in the above embodiment, a blade 9*a* is supported in the funnel. Beneath the support 6*a* there is provided a receptacle 10*a*, which is connected to a motor 3*a* the drive shaft 23 of which carries a cam wheel 24. A driving belt 25 is laid around the cam wheel 24 and the support 6*a* of circular cross section.

The support 6*a* is rotatably mounted in a manner that is not shown here in further detail.

After the radish 5*a* has been introduced in the cutting device as described above, the motor 3*a* is switched on and the support 6*a* is set to rotate. Thereby the radish 5*a* is cut into a spiral-like coil 11*a* and during the cutting operation, should that be the case, the additional weights 22 are advanced by the weight 21 in the direction toward the blade 9*a*.

The support 6*a* with the blade 9*a* can evidently be driven also in a manner other than by a driving belt.

I claim:

1. A cutting device for fruits such as radishes, cucumbers, apples or the like, and for cheese and sausages, which includes a support for an item to be cut, a blade, having a cutting edge, extending substantially radially from a longitudinal axis of the item to be cut and affixed to a leading edge of said support, said support having an axis of rotation, a drive, specially an electric motor, for rotating the support around the axis of rotation thus spiral cutting the item to be cut, a vertical guide to move the item to be cut in a direction toward said blade, the item to be cut is non-rotatable and said support (6), rotated by said drive, is further provided with a funnel-shaped depression (funnel 7) situated substantially in said axis of rotation for centering said item to be cut (5), said support (6) further includes a recess (8) for said blade (9), which recess starts from a point of passage of said axis of rotation and extends substantially radially, the cutting edge of said blade projecting above said funnel-shaped depression and defining an aperture (12) for discharging the item that has been cut in spiral form.

2. A cutting device according to claim 1, characterized in that for centering said item to be cut (5) in said funnel shaped-depression (7) of said support there is provided a weight (21, 22) that acts upon said item to be cut (5) in the direction toward said blade (9).

3. A cutting device according to claim 1, characterized in that said blade (9*a*) is constructed as rotating circular blade or band blade.

* * * * *